United States Patent
Weinhold et al.

(10) Patent No.: US 6,348,778 B1
(45) Date of Patent: Feb. 19, 2002

(54) METHOD AND APPARATUS FOR IMPROVING THE VOLTAGE QUALITY OF SECONDARY POWER SUPPLY UNIT

(75) Inventors: Michael Weinhold, Erlangen; Rainer Zurowski, Forchheim; Leon Voss, Erlangen, all of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/514,270

(22) Filed: Feb. 28, 2000

Related U.S. Application Data

(63) Continuation of application No. PCT/DE98/02388, filed on Aug. 17, 1998.

(30) Foreign Application Priority Data

Aug. 28, 1997 (DE) .......................... 197 37 590

(51) Int. Cl.[7] .................. H02M 5/40; H02J 3/00; G05F 1/70
(52) U.S. Cl. ...................... 323/207; 363/34
(58) Field of Search ............... 323/207, 205; 363/34, 37

(56) References Cited

U.S. PATENT DOCUMENTS

| | | | |
|---|---|---|---|
| 4,771,225 A | * | 9/1988 | Nishikawa .............. 323/210 |
| 5,384,528 A | * | 1/1995 | Leowald et al. ........ 323/209 |
| 5,483,148 A | * | 1/1996 | Torrey .................... 323/205 |
| 5,610,501 A | * | 3/1997 | Nelson et al. .......... 323/207 |
| 5,734,257 A | * | 3/1998 | Schauder et al. ....... 323/207 |
| 6,104,172 A | * | 8/2000 | Josephs et al. ......... 323/222 |

OTHER PUBLICATIONS

International Publication No. WO 96/03683 (Schauder et al.), dated Feb. 8, 1996.
"Shunt–Connected Power Conditioner for Improvement of Power Quality in Distribution Networks" (Sonnenschein et al.), Proceedings of the ICHQP, 7th International Conference on Harmonics and Quality of Power, 1996, pp. 27–32.
"Netzqualität im Griff" (Network Quality under control)–(Thomas Mangold et al.), EV–Report Information in the Field of Energy Transmission and–Distribution, No. 4, 1996, pp. 16–18.
"New Trends in Active Filters" (Akagi), 6th European Conference on Power Electronics and Applications, Sevilla, 1995, vol. 1, pp. 17–26, European Power Electronics and Drives Association.

\* cited by examiner

*Primary Examiner*—Bao Q. Vu
(74) *Attorney, Agent, or Firm*—Herbert L. Lerner; Laurence A. Greenberg; Werner H. Stemer

(57) ABSTRACT

A method and an apparatus for improving the voltage quality of a secondary power supply unit uses a compensation device with a pulse-controlled power converter which is connected serially to a transmission line through the use of a coupling transformer. Positive and negative phase-sequence system deviations are determined and a basic transmission ratio space-vector is generated from them. Control signals for a pulse-controlled power converter are generated from the basic transmission ratio space-vector through the use of the link voltage of the pulse-controlled power converter. As a result, a compensator voltage is connected serially into the transmission line. A power system voltage of an ideal power supply system is thus generated for a secondary power supply unit from a distorted power system voltage.

13 Claims, 8 Drawing Sheets

METHOD AND APPARATUS FOR IMPROVING THE VOLTAGE QUALITY OF SECONDARY POWER SUPPLY UNIT

CROSS-REFERENCE TO RELATED APPLICATION

This application is a continuation of copending international Application No. PCT/DE98/02388, filed Aug. 17, 1998, which designated the United States.

BACKGROUND OF THE INVENTION

FIELD OF THE INVENTION

The invention relates to a method and an apparatus for improving the voltage quality of a secondary power supply unit through the use of a compensation device which has a pulse-controlled power converter with at least one capacitive storage device, a matching filter, a closed-loop and open-loop control device and an incoming feeder device, the compensation device being coupled serially to the power system through the use of a transformer.

Such a compensation device is known from an article entitled "Netzqualität im Griff [Tackling Power System Quality]" in the journal "EV Report-Information des Bereichs Energieübertragung und -verteilung [Electronic Processing Report—Information on Power Transmission and Distribution]", from the firm Siemens, pages 16 to 18, 1996, Order No. E50001-U700-R964. That compensation device, which is also referred to as SIPCON S, is connected directly into the load flow. Through the use of that compensation device, an additional voltage is added to the power system voltage and the supply voltage of a load is thus kept constant (secondary power supply unit). The energy which is fed-in in that device is taken from the voltage link to which power is continuously fed from the power system through the use of a diode rectifier as an incoming feeder device. An energy accumulator may also be provided as an incoming feeder device. Through the use of that compensation device, it is also possible to eliminate asymmetrical voltage dips or increases (1 or 2 pole faults) in the power system. It is necessary to make the incoming feeder device capable of feedback in order to compensate voltage increases. In addition, voltage distortions in the power system voltage which are generated by harmonics can be kept away from the power supply voltage of a load with that compensation device.

That paper also states that a pulse-width-modulated IGBT power converter, which has a d.c. voltage capacitor, is provided as a pulse-controlled power converter of that compensation device. The connection to the power system is made through the use of a matching filter, for example an LCL combination. The method of coupling the compensation device determines its method of operation. The serial method of coupling optimizes the voltage quality which is supplied to a load from the outside. In contrast, a parallel method of coupling cleans up the currents which go from a load into a power system. Correspondingly, the compensation device with serial coupling corresponds to a controlled voltage source, whereas the compensation device with parallel coupling corresponds to a controlled power source.

Voltage changes in a power supply system arise, for example, due to power system faults or switching operations. The changes can leave the permitted voltage range and thus lead to a failure of loads (for example a voltage dip to 50% of the rated value causes a contactor to be dropped or a rotational-speed-variable drive to switch off) or even to loads being destroyed (20% overvoltage). Therefore, for fault-free operation it is necessary to compensate those changes in the power system voltage. Studies have shown that the most frequent cause of voltage dips are faults in the transmission and distribution power system. The period of time until a fault is detected can extend between a few cycles and a few seconds. Those voltage dips (for example below 70% for a few cycles) can disrupt automated processes because the functioning of computers, robots and drives depends heavily on the voltage quality.

The increasing use of nonlinear loads (in particular diode rectifiers such as are located, for example, in power supply units of PCs, television sets, etc.) in power supply systems distorts the voltage increasingly. Their currents have, in fact, high harmonic levels and cause voltage drops across the power system impedances which are superimposed on the originally sinusoidal power system voltage. At excessively high values, those voltage distortions can lead to overloading of the power system operating equipment (e.g. transformers, compensation systems) and disrupt the orderly operation of other loads.

Public power companies and national working groups (for example IEC) have therefore issued recommendations relating to the maximum permissible voltage distortion which a load may cause. Those recommendations have been used as a basis for the EN standards which came into force in January 1996. So-called compatibility levels for individual harmonics in low-voltage power system have been defined, for example. Equipment manufacturers must develop their products in such a way that equipment can still function without faults with those distortion values. Power companies must ensure that the compatibility levels are not exceeded in their power system.

However, in many power systems the power system voltage distortion has already reached the compatibility level and a further increase is expected. For that reason, it is important to protect sensitive equipment against harmonics present in the power system voltage. That problem also includes the undesired filtering out of a ripple control signal into secondary power supply units.

Heretofore the problem of power system supply harmonics and of the filtering out of a ripple control signal has been solved by using conventional blocking filter circuits. Since the middle of the 80s, active filters have also been used which have control methods that operate both in the time domain and frequency domain. In the conference report entitled "New Trends in Active Filters" by H. Akagi, reprinted in "Conference Proceedings of EPE '95" in Seville, pages 0.017 to 0.026, various active filters have been proposed.

An ideal, three-phase power supply system supplies the load with three purely sinusoidal voltages which have a constant frequency and are displaced by 120° el. with respect to one another and have constant, identical peak values, i.e. a pure positive phase-sequence system space-vector with a rated voltage as amplitude. The ideal power system currents for that power system are proportional to the corresponding conductor/ground power system voltage in each phase. The proportionality factor is equal in all three phases and is constant with steady-state loads. That is because a required quantity of energy or active power is then transferred with the minimum collective current r.m.s value and thus with the lowest-possible capacity utilization of the power system. Those currents are defined as active currents. Such an ideal load displays a steady-state characteristic for the power supply system, like a three-phase balanced resistive impedance.

Any load which deviates from that characteristic produces current components which contribute nothing to the transmission of active power. Those are referred to as reactive currents. Assuming that the power supply voltages approximately correspond to the above-mentioned ideal case, those reactive currents contain the harmonic currents (including a d.c. component), the frequency of which is a multiple of the power system frequency, the fundamental displacement reactive currents, which are produced by the phase displacement between the power system voltage fundamental and power system current fundamental, and the fundamental negative phase-sequence system currents which are due to asymmetrical loads. The harmonic currents are generally divided into harmonics (harmonic frequency as an integral multiple of the power system frequency), interharmonics (harmonic frequency as a rational multiple of the power system frequency) and quasi-harmonics (harmonic frequency as an irrational multiple of the power system frequency).

Those reactive current components give rise to an undesired voltage drop at the power system impedances and cause distorted power system voltages for other loads. Likewise, loads which are switched statistically (nonperiodically) or power system errors give rise to distorted voltages for other loads.

Generally, the power system voltage is composed of the required fundamental positive phase-sequence system component with rated value amplitude and the distortion components. Those distortion components of the power system voltage can be distinguished as follows:

1. harmonic components in the wider sense (harmonics, interharmonics, quasiharmonics)
2. fundamental negative phase-sequence system
3. difference between the amplitude of the fundamental positive phase-sequence system and the rated value.

SUMMARY OF THE INVENTION

It is accordingly an object of the invention to provide a method and an apparatus for improving the voltage quality of a secondary power supply unit, which overcome the hereinafore-mentioned disadvantages of the heretofore-known methods and apparatuses of this general type.

With the foregoing and other objects in view there is provided, in accordance with the invention, a method for improving the voltage quality of a secondary power supply unit, which comprises providing a compensation device having a pulse-controlled power converter with at least one capacitive storage device, a matching filter, a closed-loop and open-loop control device and an incoming feeder device; serially coupling the compensation device to a power system with a coupling transformer; determining a fundamental positive phase-sequence system deviation of a determined power system voltage space-vector as a function of a predefined positive phase-sequence system setpoint voltage; determining a fundamental negative phase-sequence system deviation of the determined power system voltage space-vector as a function of a predetermined fundamental negative phase-sequence system setpoint-space-vector; determining a basic transmission ratio space-vector as a function of the determined fundamental positive and negative phase-sequence system deviations, of a transformation transmission ratio of the coupling transformer and of a value of a link voltage of the pulse-controlled power converter; and generating control signals for the pulse-controlled power converter of the compensation device as a function of the determined basic transmission ratio space-vector of the link voltage of the pulse-controlled power converter.

In order to improve the voltage quality of a secondary power supply unit, distorted power system voltage components must be kept away from this secondary power supply unit, for example a load. For this purpose, the compensation device must feed in these components serially through the use of a transformer between the power system and the load. For this purpose the nonideal voltage components to be compensated for are initially identified from a power system voltage space-vector. From these identified undesired voltage components, at least one basic transmission ratio space-vector is calculated, through the use of which a corresponding compensation voltage space-vector is then generated at the output of the pulse-controlled power converter of the compensation device. This compensation voltage space-vector is used to change a power system voltage space-vector with unwanted voltage components into a power system voltage setpoint-space-vector.

A publication entitled "Shunt-Connected Power Conditioner for Improvement of Power Quality in Distribution Networks", reprinted in "International Conference on Harmonics and Quality of Power", Las Vegas, Oct. 16–18, 1996, discloses a control method for a compensation device with parallel coupling. That conference report shows that the compensation voltage space-vector is calculated from the voltage drop across the capacitive storage device and from a transmission characteristic space-vector. In addition, that report indicates that the transmission ratio space-vector can be composed of a plurality of partial-ratio space-vectors. Additionally, it is shown how the partial transmission ratio space-vectors are determined. As mentioned at the outset, a compensation device with parallel coupling behaves like a controlled current source and a compensation device with serial coupling behaves like a controlled voltage source. The control characteristics for that known compensation device can therefore not be applied to a compensating device with serial coupling.

The aforesaid distortion components of the power system voltage can be eliminated individually or in any desired combination with one another. In order to ensure that the power system voltage space-vector has only one positive phase-sequence system space-vector of the secondary power supply unit with rated voltage as amplitude (ideal power supply system), at least one corresponding basic transmission ratio space-vector has to be generated.

In accordance with another mode of the invention, individual harmonics of the positive and/or negative phase-sequence system are eliminated by determining corresponding partial transmission ratio space-vectors, and the space-vectors are then added to the basic transmission ratio space-vector.

In accordance with a further mode of the invention, a partial transmission ratio space-vector for an active power transfer is acquired and superimposed at least on the basic transmission ratio space-vector. Thus, not only are unwanted voltage components kept away from the primary power supply unit but this also gives rise to an active power exchange and thus causes the link voltage of the pulse-controlled power converter to be regulated.

In accordance with an added mode of the invention, a correction value which is determined as a function of a determined reactive displacement power of the fundamental and a constant is added to the positive phase-sequence system setpoint voltage. This compensates the voltage drop across the coupling filter and across the transformer, which is caused by a load current component of the fundamental positive phase-sequence system.

With the objects of the invention in view, there is also provided an apparatus for improving the voltage quality of a secondary power supply unit, comprising a compensation device having a pulse-controlled power converter with at least one capacitive storage device, a matching filter, a closed-loop and open-loop control device and an incoming feeder device; the closed-loop and open-loop control device having a closed-loop control device for determining a transmission ratio space-vector, and the closed-loop and open-loop control device having a pulse-width modulator with outputs supplying control signals for the pulse-controlled power converter; a coupling transformer serially coupling the compensator device to a power supply system; the closed-loop control device having a controller for determining a basic transmission ratio space-vector, the controller having an input side, a positive phase-sequence system channel and a negative phase-sequence system channel on the input side, the positive phase-sequence system channel and the negative phase-sequence system channel having output sides, and an output-side computing device having inputs connected to the output sides of the positive phase-sequence system channel and the negative phase-sequence system channel; the computing device having an output supplying the basic transmission ratio space-vector, and the computing device receiving a value of a link voltage of the capacitive storage device of the pulse-controlled power converter and a value of a transformer transmission ratio of the coupling transformer; and the positive phase-sequence system channel and the negative phase-sequence system channel each receiving a determined power system voltage space-vector and each having an output supplying a respective one of a fundamental positive phase-sequence system deviation and a fundamental negative phase-sequence system deviation.

Through the use of these two channels, a positive phase-sequence system deviation and a negative phase-sequence system deviation are determined. The basic transmission ratio space-vector is then determined from the deviation values as a function of the link voltage of the pulse-controlled power converter and of a transformer transmission ratio using the computing device. Through the use of this basic transmission ratio space-vector, the pulse-controlled power converter generates a compensator voltage space-vector, as a result of which the power system voltage space-vector in the secondary power supply unit is now only a positive phase-sequence system space-vector with the rated voltage as amplitude. The determined positive and negative phase-sequence system deviations are each a measure of the distortion components which are present in the power system voltage and which are kept away from the secondary power supply unit.

In accordance with another feature of the invention, the transmission ratio space-vector is composed of the basic transmission ratio space-vector and at least one partial transmission ratio space-vector through the use of which harmonics of the positive and negative phase-sequence systems can be compensated. That is to say, for example, three further controllers are needed to compensate the distortion voltage components of the fundamental negative phase-sequence system, the 5th harmonic of the negative phase-sequence system and the 7th harmonic of the positive phase-sequence system of the power system voltage. Each controller calculates, from a determined voltage space-vector, for example a load-voltage space-vector, a partial transmission ratio space-vector which is added to an overall transmission ratio space-vector.

In accordance with a further feature of the invention, the fundamental negative phase-sequence system actual-space-vector is determined from the difference between the power system voltage space-vector and an identified fundamental positive phase-sequence system actual-space-vector. Since the power system voltage space-vector is used to acquire this vector without any further operation, the fundamental actual-space-vector is obtained directly without time delay. As a result, this device for acquiring a basic transmission ratio space-vector has very high dynamics. However, as a result of the formation of differences, not only the fundamental negative phase-sequence system actual-space-vector but also harmonics of the power system voltage which may possibly be present, are obtained. If the fundamental negative phase-sequence system actual-space-vector is identified, in the same way as the fundamental positive phase-sequence system actual-space-vector, from the power system voltage space-vector, this device for acquiring a basic transmission ratio space-vector will experience a decisive loss of dynamic response.

In accordance with a concomitant feature of the invention, there is provided a device for acquiring a partial transmission ratio space-vector for an active power transfer in the closed-loop control device of the pulse-controlled power converter. This device brings about an active power exchange, as a result of which the link voltage of the pulse-controlled power converter is regulated to a setpoint value. For this purpose, this device is supplied with a compensator current space-vector from which a frequency system, for example the fundamental positive phase-sequence system, is identified through the use of a discrete Fourier transformation and an inverse discrete Fourier transformation. This identified space-vector is then multiplied by a manipulated variable of a link voltage control loop. The partial transmission ratio space-vector which is obtained in this way is added at least to the basic transmission ratio space-vector to form an overall transmission ratio space-vector.

Other features which are considered as characteristic for the invention are set forth in the appended claims.

Although the invention is illustrated and described herein as embodied in a method and an apparatus for improving the voltage quality of a secondary power supply unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
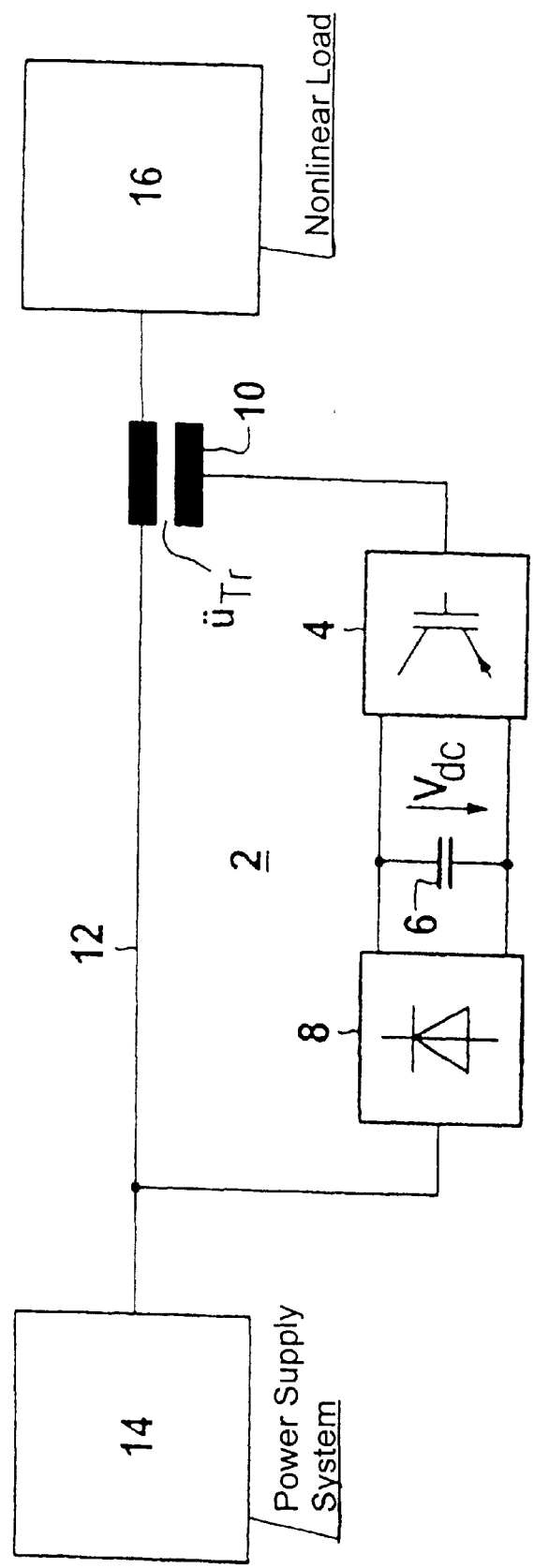
FIG. 1 is a schematic and block diagram of a known compensation device.

Referring now to the figures of the drawings in detail and first, particularly, to FIG. 1 thereof, there is seen a schematic and block diagram of a known compensation device 2 which has been presented in the company journal mentioned at the outset, entitled "EV Report-Information des Bereichs Energieübertragung und -verteilung" [Electronic Processing Report —Information on Energy Transmission and Distribution]. This compensation device 2 has a pulse-controlled power converter 4 with at least one capacitive storage device 6, an incoming feeder power converter 8 acting as an incoming feeder device and a transformer 10, which is also referred to as a coupling transformer. The incoming feeder power converter is connected on an alternating voltage side to a transmission line 12 which connects a power supply system 14 to a secondary power supply unit, for example a nonlinear load 16. The incoming feeder power converter is connected electrically in parallel, on a d.c. voltage side, with the capacitive storage device 6 of the pulse-controlled power converter 4. A pulse-controlled power converter may also be provided as the incoming feeder device 8, as a result of which this incoming feeder device 8 is capable of feedback. In addition, a capacitive or inductive energy accumulator may also be provided as the incoming feeder device 8. The pulse-controlled power converter 4 is in turn connected serially into the transmission line 12 through the use of the transformer 10. A link power is fed to the capacitive storage device 6 through the use of the incoming feeder power converter 8. The type of incoming feeder power converter being used is determined by an active power transfer requirement which is made of the link of the pulse-controlled power converter 4. If only the voltage of a passive load 6 is to be backed up, a diode bridge is sufficient as the incoming feeder power converter 8 because the pulse-controlled power converter 4 only has to output active power. If active power from the link of the pulse-controlled power converter 4 is output to the power system 14, a power converter which is capable of feedback is required as the incoming feeder power converter 8.

Figure 2:
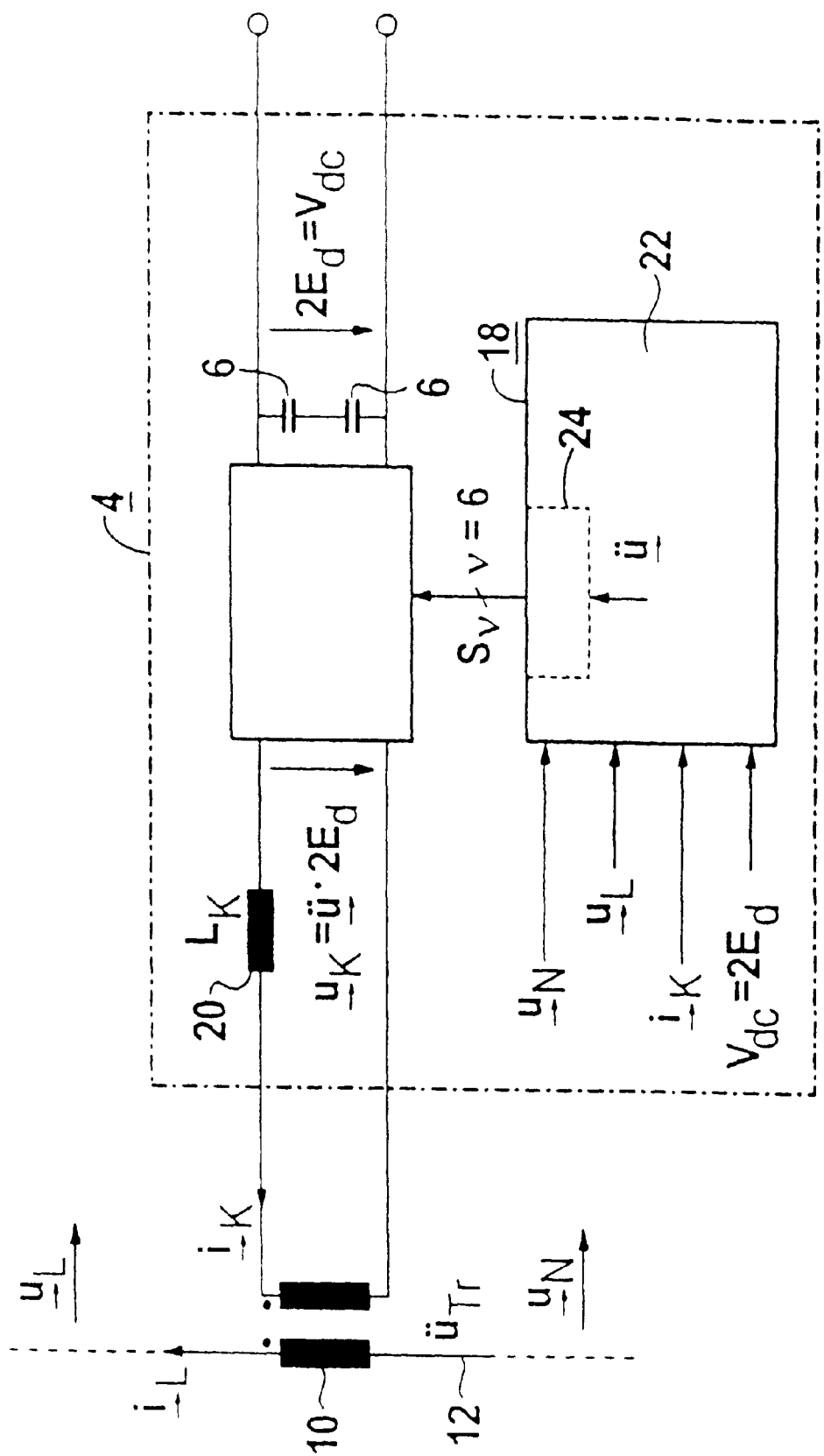
FIG. 2 is a schematic and block diagram of a pulse controlled power converter of the compensation device according to FIG. 1.

The pulse-controlled power converter 4 of the compensation device 2 is illustrated in more detail in FIG. 2. This pulse-controlled power converter 4 has not only a power converter circuit (hardware) but also a closed-loop and open-loop control device 18 (software) and a matching filter 20. The matching filter 20 is illustrated in this case by way of an equivalent by an inductance $L_K$, whereas this matching filter 20 is shown in detail in the company journal mentioned at the outset. The closed-loop and open-loop control device 18 has a closed-loop control device for determining a transmission ratio space-vector $$\vec{\ddot{u}}$$

and a pulse-width modulator 24 which is illustrated by a broken line. The transmission ratio space-vector $$\vec{\ddot{u}}$$

is a manipulated variable of the pulse-controlled power converter 4 which is converted through the use of the pulse-width modulator 24 into control signals $S_V$ for this pulse-controlled power converter 4. The structure of the closed-loop control device 22 is illustrated in more detail in FIG. 3. As mentioned above, this pulse-controlled power converter 4 is connected serially into the transmission line 12 through the use of the transformer 10.

The closed-loop and open-loop control device 18 is supplied with a power system voltage space-vector $$\underline{u}_N,$$

a voltage space-vector $$\underline{u}_L$$

of the secondary power supply unit 16, a compensator current space-vector $$\underline{i}_K$$

and a link voltage $V_{dc}=2E_d$, which is dropped at the two capacitive storage devices 6 of the pulse-controlled power converter 4. These space-vectors $$\underline{u}_N, \underline{u}_L \text{ and } \underline{u}_K$$

are generated from measured conductor voltages, load voltages and compensator currents through the use of a space-vector transformation device. In general, the power system voltage $$\underline{u}_N$$

is composed of a desired fundamental positive phase-sequence system component $$\underline{u}_{N.1+}$$

with a rated value amplitude and a distortion component $$\underline{u}_{N.v\pm}.$$

In order to keep distorted power system voltage components $$\underline{u}_{N.v\pm}$$

away from the load 16, the compensation device 2 must feed in these components $$\underline{u}_{N.v\pm}$$

serially between the power system 14 and the load 16 through the use of the coupling transformer 10. For this purpose, the nonideal components to be compensated are initially calculated from the power system voltage space-vector $$\underline{u}_N.$$

The function of the closed-loop control device 22 is to determine the overall transmission ratio space-vector $$\underline{\ddot{u}}$$

between the link voltage $V_{dc}$ and the compensator voltage space-vector $$\underline{u}_K$$

on the power system side, which is necessary to generate a compensator voltage space-vector $$\underline{u}_K.$$

The link voltage $V_{dc}=2E_d$ is given by the incoming feeder power converter 8.

Figure 3:
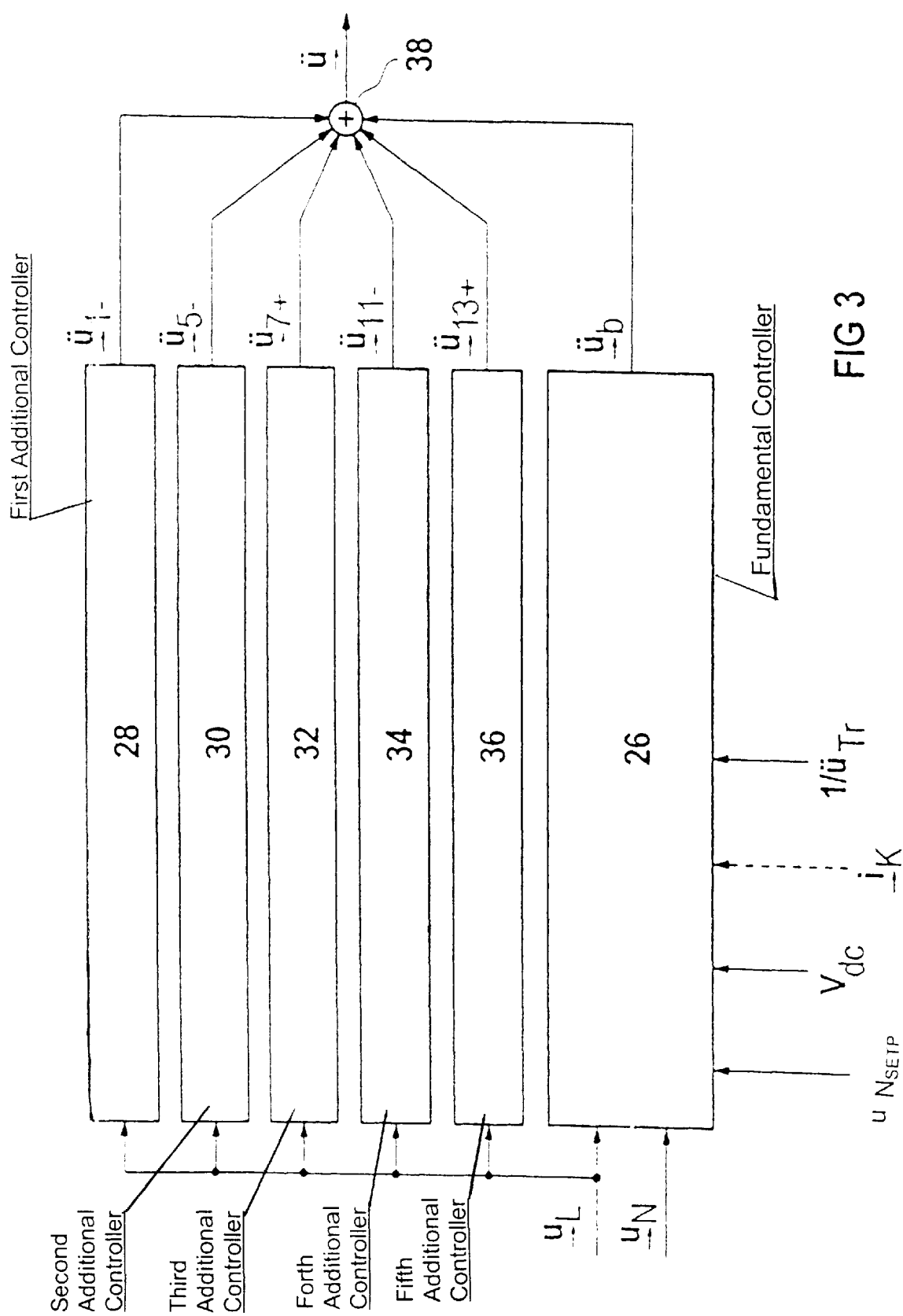
FIG. 3 is a schematic and block diagram showing a structure of a controller for generating an overall transmission ratio space-vector.
Figure 4:
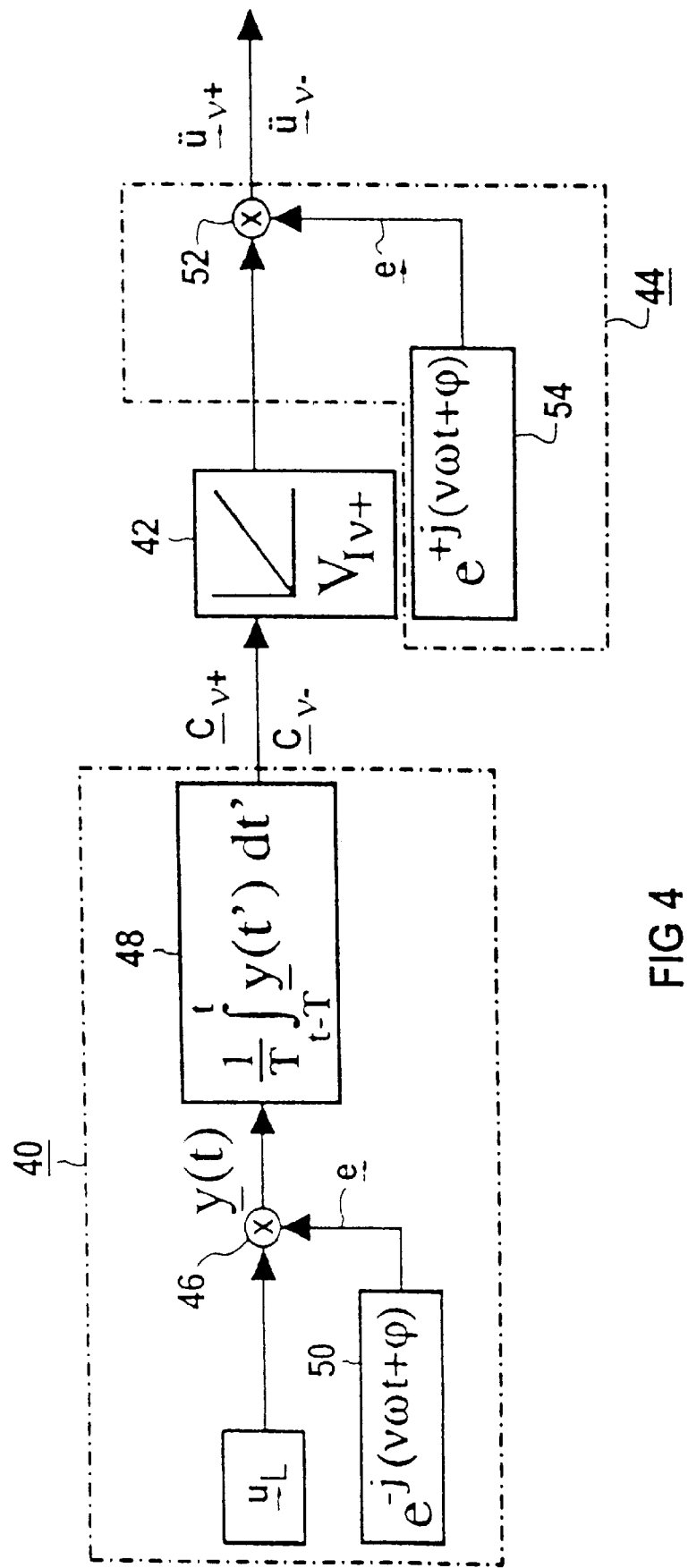
FIG. 4 is a schematic and block diagram showing a known control structure for generating a partial transmission ratio space-vector.

In order to be able to carry out the compensation of the nonideal power system voltage components $$\underline{u}_{N.v\pm}$$

according to individual harmonics, fundamental positive phase-sequence system and fundamental negative phase-sequence system, the closed-loop and open-loop control device 18 according to FIG. 3 has a separate controller 26, 28, 30, 32, 34 and 36 for each component. Outputs of the controllers 26, 28, 30, 32, 34 and 36 are connected to a summing point 38. The structure of the controller 26 is illustrated in more detail in FIG. 5 and FIG. 6, whereas the controllers 28, 30, 32, 34 and 36 are shown in more detail by a representative control structure in FIG. 4. The controller 26 is supplied with the acquired power system voltage space-vector $$\underline{u}_N$$

and parameters of a positive phase-sequence system setpoint voltage $$\underline{u}_{Nsetp},$$

the link voltage $V_{dc}$ and a value of a transformation transmission ratio $\ddot{u}_{Tr}$ as a reciprocal value. In a particularly advantageous embodiment, a compensator current space-vector $$\underline{i}_K$$

is also supplied. The controllers 28 to 36 are each supplied with a voltage space-vector $$\underline{u}_L$$

of the secondary power supply unit 16. Each controller 26 to 36 calculates from its input signal a partial transmission ratio space-vector $$\underline{\ddot{u}}_b, \underline{\ddot{u}}_{1-}, \underline{\ddot{u}}_{5-}, \underline{\ddot{u}}_{7+}, \underline{\ddot{u}}_{11-} \text{ and } \underline{\ddot{u}}_{13+},$$

from which an overall transmission ratio space-vector $$\underline{\ddot{u}}$$

is formed through the use of the summing point 38.

The controller 26 calculates the basic transmission ratio space-vector $$\underline{\ddot{u}}_b,$$

as the partial transmission ratio space-vector, for compensating a fundamental positive phase-sequence system voltage difference. The controller 28 calculates the partial transmission ratio space-vector $$\underline{\ddot{u}}_{1-}$$

for compensating a fundamental negative phase-sequence system voltage of the power system voltage $u_L$ of the secondary power supply unit 16. The controllers 30 to 36 each calculate a partial transmission ratio space-vector $$\underline{\ddot{u}}_{5-}, \underline{\ddot{u}}_{7+}, \underline{\ddot{u}}_{11-} \text{ and } \underline{\ddot{u}}_{13+}$$

in order to compensate the four largest harmonics of the voltage space-vector $u_L$ of the secondary power supply unit 16.

The controllers 28, 30, 32, 34 and 36 which generate the partial transmission ratio space-vectors $$\underline{\ddot{u}}_{1-}, \underline{\ddot{u}}_{5-}, \underline{\ddot{u}}_{7+}, \underline{\ddot{u}}_{11-} \text{ and } \underline{\ddot{u}}_{13+}$$

are distinguished by an ordinal number v of the harmonics and by whether they occur in the positive (+) or negative (−) phase-sequence system. For this reason, a generalized control structure is shown in more detail in FIG. 4 as being representative of these controllers 28, 30, 32, 34 and 36.

This control structure has a device 40 on the input side for forming a complex Fourier coefficient $$\underline{C}_{v+} \text{ and } \underline{C}_{v-},$$

downstream of which a PI controller 42 is connected. This PI controller 42 is connected on the output side to a device 44 for forming a respective partial transmission ratio space-vector $$\underline{\ddot{u}}_{v+} \text{ or } \underline{\ddot{u}}_{v-}.$$

The device 40 has a complex multiplier 46 with a downstream averaging device 48. One input of this complex multiplier 46 is connected to an output of a unity space-vector former 50. The power system voltage space-vector $$\underline{u}_L$$

of the secondary power supply unit 16 is at another input of this complex multiplier 46. The respective complex Fourier coefficients $$\underline{C}_{v+} \text{ and } \underline{C}_{v-}$$

are acquired from a product y(t) which is present at an output of the complex multiplier 46, with respect to one power system period, through the use of the averaging device 48. In this case, reference symbol v identifies the ordinal number of the compensating harmonic and "+" and "−" respectively identify the positive phase-sequence system and the negative phase-sequence system. A conjugate complex unity space-vector $$\underline{e}^*$$

rotates in the positive phase-sequence system with a rotational frequency +vω and in the negative phase-sequence system with a rotational frequency of −vω. Reference symbol ω represents the rotational frequency of the power system voltage fundamental space-vector. The averaging over the power system period enables the complex Fourier coefficient $\underline{C}_{v+}$ and $\underline{C}_{v-}$ of the respective power system voltage component to be obtained from the product y(t) of the power system voltage space-vector $$\underline{u}_L$$

of the secondary power supply unit 16 and the conjugate complex unity space-vector $$\underline{e}^*.$$

An output signal of the I controller 42 is multiplied by a unity space-vector $$\underline{e}$$

through the use of a further complex multiplier 52. The unity space-vector $$\underline{e}$$

is formed from a further unity space-vector former 54. A product of this multiplication is the partial transmission ratio space-vector $$\underline{\ddot{u}}_{v+} \text{ or } \underline{\ddot{u}}_{v-}.$$

The I controller 42 changes the absolute value and the angle of the partial transmission ratio space-vector $$\underline{\ddot{u}}_{v+} \text{ or } \underline{\ddot{u}}_{v-}$$

until a corresponding harmonic of the $v^{th}$ ordinal number of the positive or negative phase-sequence system in the power system voltage space-vector $\underline{u}_L$ of the secondary power supply unit 16 is eliminated.

A controller 28, 30, 32, 34 and 36 must be provided for each harmonic which is to be compensated. In order to compensate the asymmetry of the fundamental, it is necessary to provide a negative phase-sequence system controller with the ordinal number v=1 (controller 28).

Figure 5:
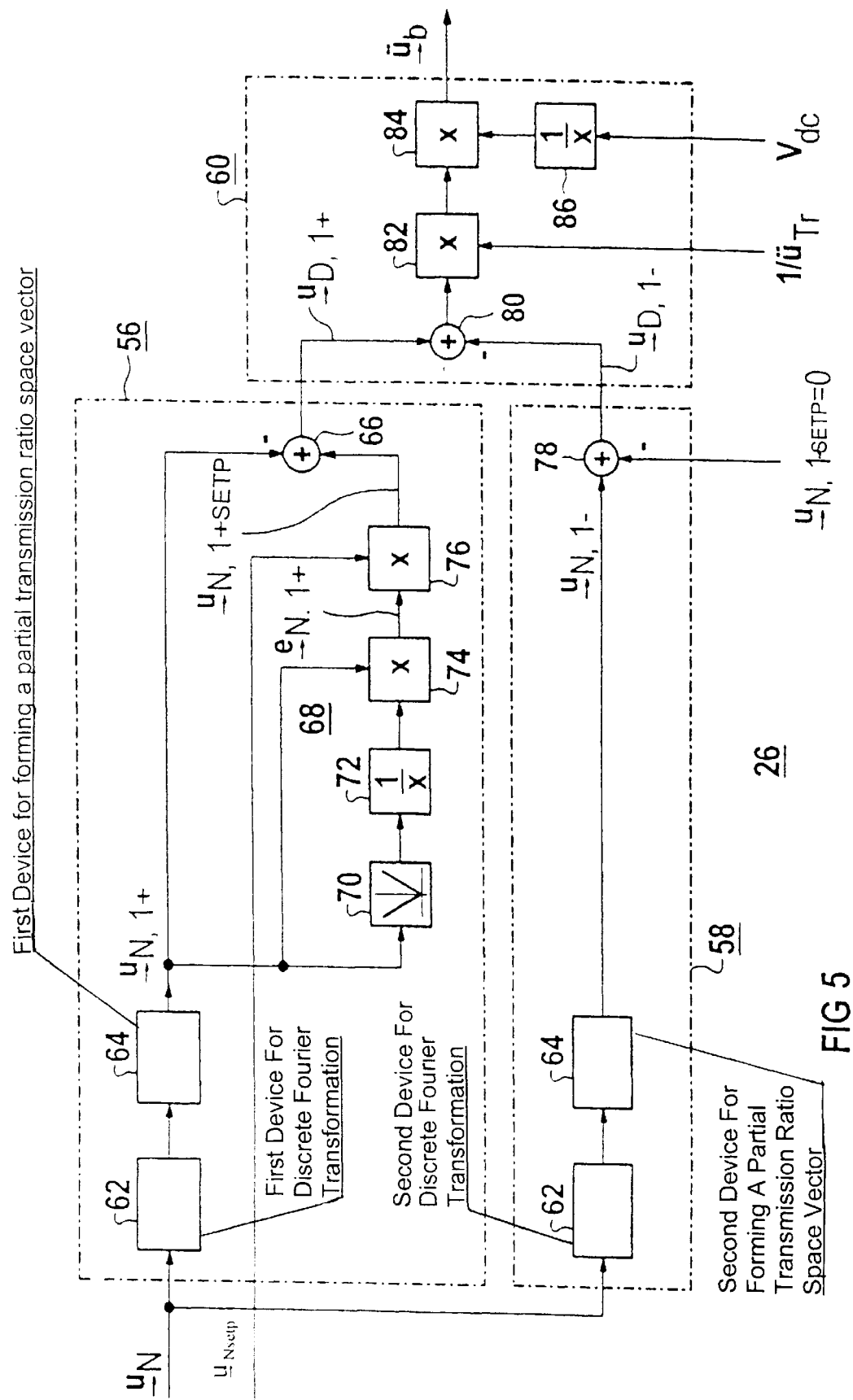
FIG. 5 is a schematic and block diagram showing a first control structure for generating a basic transmission ratio space-vector.

FIG. 5 shows a first control structure of the controller 26, having an output at which the basic transmission ratio space-vector $$\underline{\ddot{u}}_b$$

is present. This controller 26 has an input side with a positive phase-sequence system channel 56 and a negative phase-sequence system channel 58 which are connected on the output side to a computing unit 60. The positive phase-sequence system channel 56 has a first device 62 on the input side for discrete Fourier transformation. A second device 64 for inverse discrete Fourier transformation is connected downstream of the device 62. The structure of this device 62 corresponds to the structure of the device 40 for forming a complex Fourier coefficient in FIG. 4. In this case, instead of the power system voltage space-vector $$\underline{u}_L$$

of the secondary power supply unit 16, a power system voltage space-vector $$\underline{u}_N$$

is used. The device 64 corresponds to the device 44 in FIG. 4. There is then a fundamental positive phase-sequence system actual-space-vector $$\underline{u}_{N.1+}$$

at an output of the device 64. The output of the device 64 is connected, firstly, to an inverting input of a comparator 66 and, secondly, to a noninverting input of this comparator 66 through a third device 68 for forming a fundamental positive phase-sequence setpoint-space-vector $$\underline{u}_{N.1+setp}.$$

The device 68 for forming the fundamental positive phase-sequence system setpoint-space-vector $$\underline{u}_{N.1+setp}$$

has an absolute-value generator 70, a first reciprocal-value generator 72 and first and second multipliers 74 and 76. The absolute-value generator 70 is disposed on an input side of this device 68 and has an input side connected to an output of the device 64. This absolute-value generator 70 has an output side connected to the reciprocal-value generator 72 which has an output side connected to a first input of the first multiplier 74. A second input of this multiplier 74 is connected to the output of the device 64. This multiplier 74 has an output side connected to a first input of the second multiplier 76. A second input of the second multiplier 76 receives a predefined positive phase-sequence system setpoint-voltage $U_{Nsetp}$. The fundamental positive phase-sequence system setpoint-space-vector $$\underline{u}_{N.1+setp}$$

is formed at the output of this second multiplier 76.

The negative phase-sequence system channel 58 only has the devices 62 and 64 and a comparator 78. These two devices 62 and 64 are also connected electrically in series. An output side of the device 64 is connected to a noninverting input of this comparator 78, and a fundamental negative phase-sequence system setpoint-space-vector $$\underline{u}_{N.1-setp}$$

is present at an inverting input thereof. The value of this setpoint space-vector $$\underline{u}_{N.1-setp}$$

is equal to zero in this case. For this reason, this comparator 78 can be dispensed with.

Positive and negative phase-sequence deviations $$\underline{u}_{D.1+} \text{ and } \underline{u}_{D.1-}$$

which are at the outputs of the positive phase-sequence system channel 56 and the negative phase-sequence system channel 58 are added together through the use of an input adder 80 of the computing unit 60. An output of this adder 80 is connected to a first input of a first multiplier 82, having a second input at which the reciprocal value of the transmission ratio $\ddot{u}_{Tr}$ of the transformer is present. An output side of this multiplier 82 is connected to a first input of a second multiplier 84 having a second input which is connected to an output of a second reciprocal-value generator 86. The value $2E_d$ of the link voltage $V_{dc}$ is at the input of this reciprocal-value generator 86. The computing unit 60 is used to form an overall deviation $$\underline{u}_{D.1}$$

from the acquired deviations $$\underline{u}_{D.1+} \text{ and } \underline{u}_{D.1-},$$

which is converted on the power-converter side of the coupling transformer 10 and fed to the summing point 38 as the basic transmission ratio space-vector $\ddot{u}_b$.

This fundamental controller 26 is used initially to identify the fundamental positive phase-sequence system of the power system voltage $u_N$. This identified space-vector $$\underline{u}_{N.1+}$$

is divided by its absolute value and multiplied by this identified space-vector $$\underline{u}_{N.1+}.$$

The result is a fundamental positive phase-sequence unity-space-vector $$\underline{e}_{N.1},$$

which points in the direction of the fundamental positive phase-sequence system space-vector $$\underline{u}_{N.1+}$$

and has an absolute value of one. This unity space-vector $$\underline{e}_{N.1+}$$

is weighted with the setpoint value of the positive phase-sequence system voltage $u_{Nsetp}$. A difference between the weighted unity space-vector $$\underline{u}_{N.1+setp} = \underline{u}_{Nsetp} \cdot \underline{e}_{N.1+}$$

and the identified component $$\underline{u}_{N.1+}$$

is given by a fundamental positive phase-sequence system voltage $$\underline{u}_{K.1-}$$

which is to be generated by the compensator.

Since the fundamental negative phase-sequence system actual-space-vector $$\underline{u}_{N.1-}$$

is also identified through the use of a discrete Fourier transformation from the power system voltage space-vector (analogously to the fundamental positive phase-sequence system actual-space-vector $$\underline{u}_{N.1+})$$

in this first embodiment of the fundamental controller 26, the fundamental negative phase-sequence system actual-space-vector $$\underline{u}_{N.1-}$$

is obtained without any harmonics whatsoever. However, because the fundamental negative phase-sequence system actual-space-vector $$\underline{u}_{N.1-}$$

is also calculated through the use of a discrete Fourier transformation, the dynamic response of this first embodiment of the fundamental controller 26 is not very high.

Figure 6A:
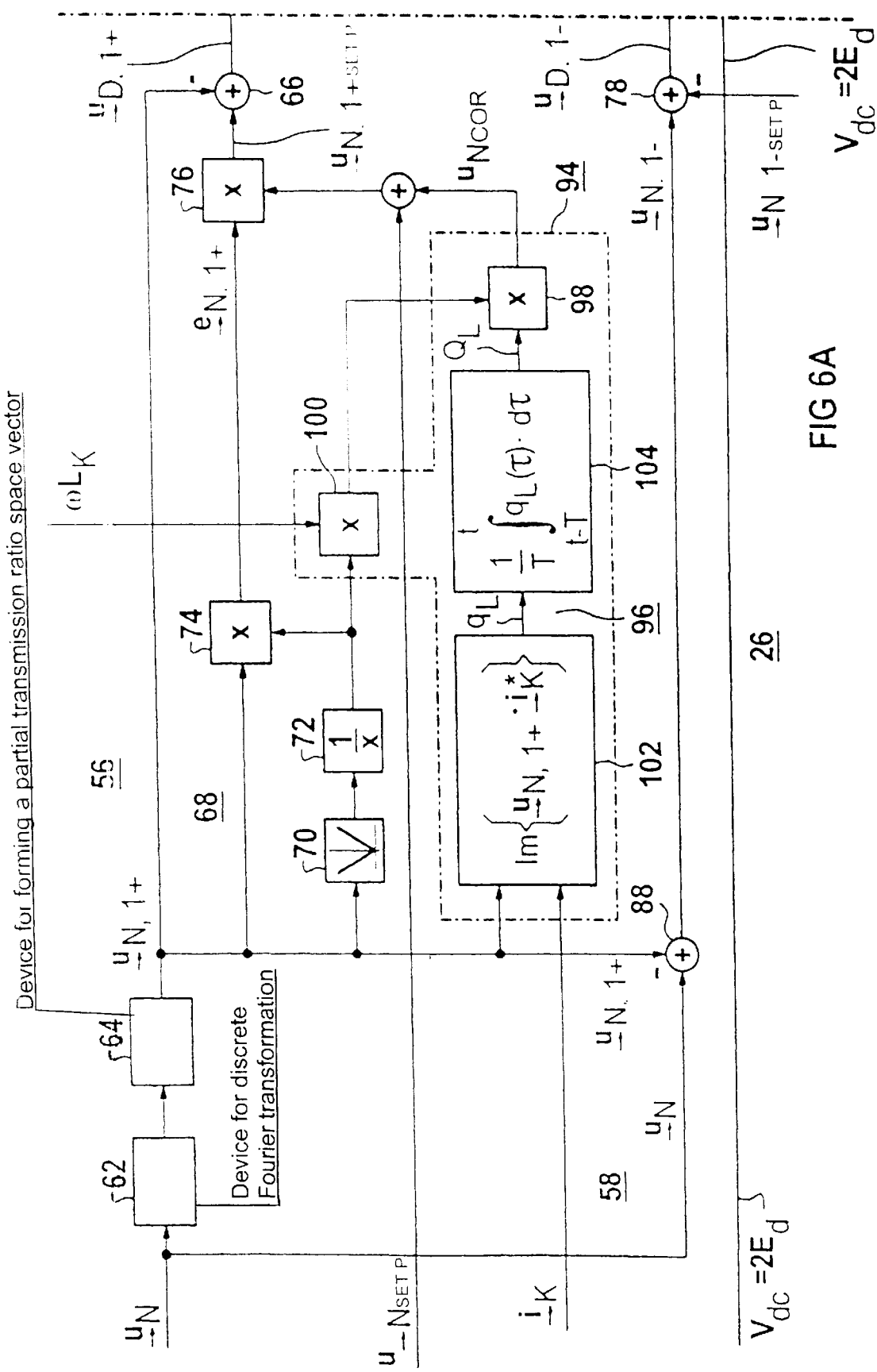
FIGS. 6A and 6B are schematic and block diagrams showing a second control structure for generating a basic transmission ratio space-vector.
Figure 6B:
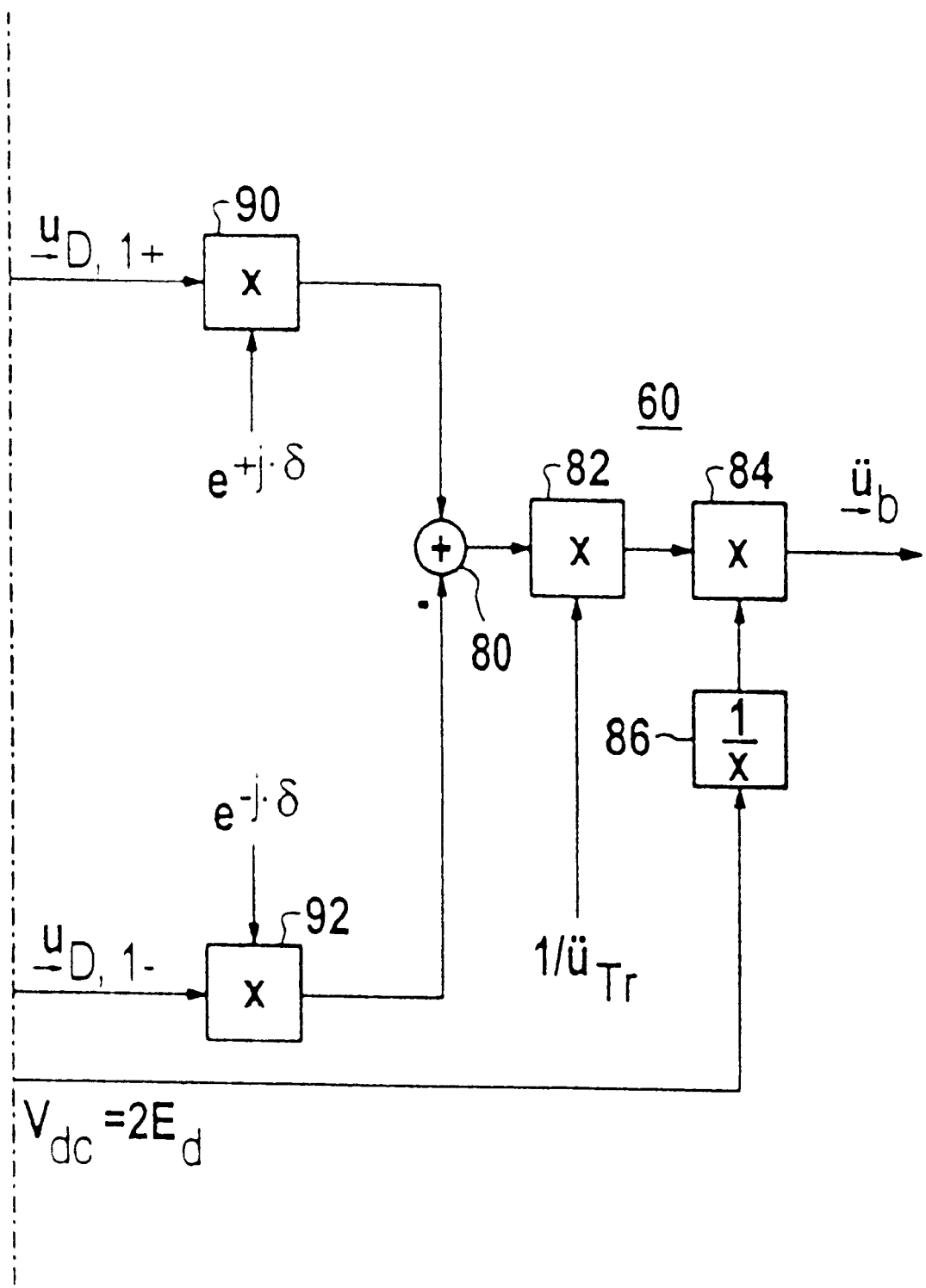

FIGS. 6A and 6B show an advantageous embodiment of the fundamental controller 26 in more detail. As is seen in FIG. 6A, this embodiment differs from the embodiment according to FIG. 5 in that the negative phase-sequence system channel 58 no longer has devices 62 and 64. Instead, a first comparator 88 is provided in this advantageous embodiment. The power system voltage space-vector $$\underline{u}_N$$

is at a noninverting input of this comparator 88 and the identified fundamental positive phase-sequence system actual-space-vector $$\underline{u}_{N.1+}$$

is at an inverting input of this comparator 88. An output of this comparator 88 is connected to the noninverting input of the second comparator 78. A space-vector $$\underline{u}_{N.1-}$$

which does not only contain the fundamental negative phase-sequence system but also any harmonics of the power system voltage $u_N$ which may be present, is then at the output of this comparator 88. In practice, these are principally a negative phase-sequence system of the 5th harmonic and a positive phase-sequence system of the 7th harmonic.

As is seen in FIG. 6B, in this embodiment, the outputs of the positive phase-sequence system channel 56 and the negative phase-sequence system channel 58 are each fed to a first input of a respective multiplier 90 and 92. The multipliers 90 and 92 have second inputs at which, in each case, there is a rotational angle $e^{j \cdot \delta}$ and $e^{-j \cdot \delta}$ with which a dead time of the discrete calculation is compensated for. Since the rotational angle $e^{-j \cdot \delta}$ is correct only for the fundamental negative phase-sequence system, the harmonics in the space-vector $$\underline{u}_{N.1-}$$

which are acquired through the use of the negative phase-sequence system channel 58 are not compensated, but instead these harmonics change in the power system voltage $$\underline{u}_N.$$

However, because the fundamental negative phase-sequence system is calculated from the difference between the power system voltage space-vector $$\underline{u}_N$$

and the identified fundamental positive phase-sequence system actual-space-vector $$\underline{u}_{N.1+},$$

the fundamental negative phase-sequence system space-vector $$\underline{u}_{N.1-}$$

is obtained directly without a time delay. As a result, this embodiment of the fundamental controller 26 has a very high dynamic response.

In contrast with the embodiment according to FIG. 5, the positive phase-sequence system channel 56 also has a device 94 seen in FIG. 6A for acquiring a correction value $u_{N_{cor}}$. This device 94 has a device 96 on the input side for determining a reactive displacement power $Q_L$ of the fundamental and first and second multipliers 98 and 100 on the output side. The device 96 for determining a reactive displacement power $Q_L$ of the fundamental has a computing device 102 for determining an instantaneous power $q_L$, which is also referred to as a transverse reactive power, and a downstream averaging device 104. This averaging device 104 forms an average value of the transverse reactive power $q_L$ over a power system cycle. The transverse reactive power $q_L$ is calculated from the identified fundamental positive phase-sequence system actual-space-vector $$\underline{u}_{N.1+}$$

and a conjugate complex compensator current space-vector $$i_k^*$$

through the use of the computing device 102. The displacement reactive power $Q_L$ of the fundamental which is present at the output of the averaging device 104 is fed to a first input of the first multiplier 98. A second input of this multiplier 98 is connected to an output of the second multiplier 100. A first input of the second multiplier 100 is connected to the output of the reciprocal-value generator 72 of the device 68 for forming a fundamental positive phase-sequence system setpoint-space-vector $$\underline{u}_{N,1-setp},$$

and a value $\omega L_K$ of the impedance of the compensator inductance is present at a second input thereof. An output of the first multiplier 98 has a correction value $$\underline{u}_{Ncor}$$

through the use of which the predefined negative phase-sequence system setpoint voltage $u_{Nsetp}$ is corrected. The device 94 is used to compensate the voltage drops of the fundamental positive phase-sequence system across the coupling transformer 10 and across the matching filter 20.

Figure 7:
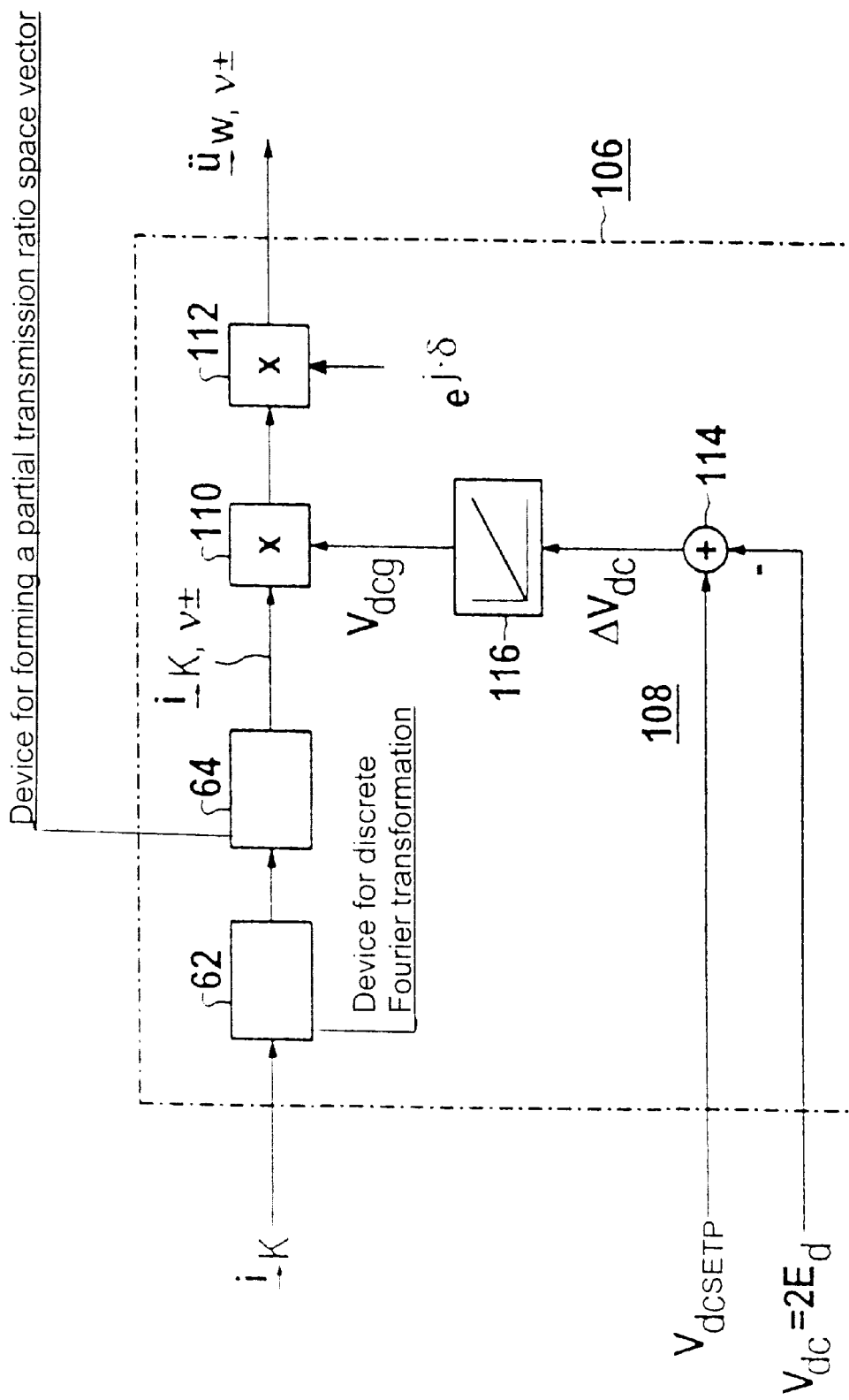
FIG. 7 is a schematic and block diagram showing a control structure for generating a partial transmission ratio space-vector for an active power transfer.

FIG. 7 shows a control structure of another control device 106, with which a partial transmission ratio space-vector $$\underline{\ddot{u}}_{w,v\pm}$$

for an active power transfer is generated. This control device 106 has the device 62 for discrete Fourier transformation, the device 64 for inverse discrete Fourier transformation, a link voltage control circuit 108 and two multipliers 110 and 112. The two devices 62 and 64 are connected electrically in series and disposed on an input side of this closed-loop control device 106. An output side of the device 64 is connected, through a first input of the multiplier 110, to a first input of the multiplier 112 which is disposed on the output side. A second input of the multiplier 110 is connected to an output of the link voltage control loop 108. A second input of the output-side multiplier 112 receives a rotational angle $e^{j \cdot \delta}$ for dead time compensation. The link voltage control loop has a comparator 114 and a voltage controller 116. A link voltage setpoint value $V_{dcsetp}$ is present at a noninverting input of this comparator 114, and the link voltage actual value $V_{dc}$ is present at an inverting input of this comparator 114. A voltage difference $\Delta V_{dc}$ which is formed is eliminated through the use of the voltage regulator 116. An I controller is provided as the voltage regulator 116.

The frequency system which is present in the power system current $$\underline{i}_L$$

of the secondary power supply unit 16 (for example fundamental positive phase-sequence system) can be used for active-power transfer, if it applies to a certain configuration (low active-power transfer necessary in comparison with the rated compensator power), for example in the case of pure harmonic compensation. This function is performed by the closed-loop control device 106 according to FIG. 7. The component ν of a frequency system "+" or "−" is identified from the compensator current space-vector $$\underline{i}_k$$

which is acquired through the use of a discrete Fourier transformation (device 62) and the inverse operation (device 64). Then, the identified current space-vector $$\underline{i}_{k,v\pm}$$

is multiplied by a phase correction factor $V_{dcg}$ which is present at the output of the voltage regulator 116. The amplitude of the space-vector which is present at the output of the multiplier 110 is the output variable $V_{dcg}$ of the voltage regulator 116 having the input variable $\Delta V_{dc}$ which is the difference between the setpoint link voltage $V_{dcsetp}$ and the measured link voltage $V_{dc}$. The acquired partial transmision ratio space-vector $$\underline{u}_{w,v\pm},$$

which is present at the output of the multiplier 112, is passed on to the pulse-width modulator 24 of the closed-loop and open-loop control device 18 of the pulse-controlled power converter 4, brings about an active power exchange and thus causes the link voltage $V_{dc}$ to be regulated to the setpoint value $V_{dcsetp}$.

Through the use of the method according to the invention, the compensation device 2 with serial coupling can improve the voltage quality of the secondary power supply unit 16 which can have a plurality of loads, wherein the compensation device has the pulse-controlled power converter 4 with at least one capacitive storage device 6. A plurality of measures to improve the voltage quality of this secondary power supply unit 16 may be carried out at the same time, individually or in any desired combination with one another. These measures include the active filtering of power system voltage harmonics, the dynamic and steady-state compensation of voltage dips and fluctuations and the blocking of a ripple control signal.

We claim:

1. A method for improving the voltage quality of a secondary power supply unit, which comprises:

a) providing a compensation device having a pulse-controlled power converter with at least one capacitive storage device, a matching filter, a closed-loop and open-loop control device and an incoming feeder device;

b) serially coupling the compensation device to a power system with a coupling transformer;

c) determining a fundamental positive phase-sequence system deviation of a determined power system voltage space-vector as a function of a predefined positive phase-sequence system setpoint voltage;

d) determining a fundamental negative phase-sequence system deviation of the determined power system voltage space-vector as a function of a predetermined fundamental negative phase-sequence system setpoint-space-vector;

e) determining a basic transmission ratio space-vector as a function of the determined fundamental positive and negative phase-sequence system deviations, of a transformation transmission ratio of the coupling transformer and of a value of a link voltage of the pulse-controlled power converter; and f) generating control signals for the pulse-controlled power converter of the compensation device as a function of the determined basic transmission ratio space-vector of the link voltage of the pulse-controlled power converter.

2. The method according to claim 1, which comprises:
a) determining at least one complex Fourier coefficient of at least one of the positive and negative phase-sequence systems from a product of a power system voltage space-vector of a secondary power supply unit and a conjugate complex unit space-vector;
b) determining a partial transmission ratio space-vector as a function of the determined complex Fourier coefficient and of a unit space-vector; and
c) vectorially adding the basic transmission ratio space-vector and the partial transmission ratio space-vector to form an overall transmission ratio space-vector.

3. The method according to claim 1, which comprises:
a) determining a current component of a determined compensator current space-vector;
b) determining a phase correction factor as a function of a link voltage actual value and a link voltage setpoint value; and
c) calculating a transmission ratio space-vector by multiplication of the identified current component with the determined phase correction factor.

4. The method according to claim 1, which comprises:
a) determining a fundamental positive phase-sequence system actual-space-vector of the determined voltage space-vector;
b) calculating a fundamental positive phase-sequence system unit-space-vector of the identified fundamental positive phase-sequence system actual-space-vector;
c) determining a fundamental positive phase-sequence system setpoint-space-vector as a function of the fundamental positive phase-sequence system unit-space-vector and a value of a positive phase-sequence system setpoint voltage; and
d) determining the fundamental positive phase-sequence system deviation by comparing the fundamental positive phase-sequence system actual-space-vector with the fundamental positive phase-sequence system setpoint-space-vector.

5. The method according to claim 1, which comprises:
a) determining a fundamental negative phase-sequence system actual-space-vector; and
b) determining the fundamental negative phase-sequence system deviation by comparing the fundamental negative phase-sequence system actual-space-vector with a predefined fundamental negative phase-sequence system setpoint-space-vector.

6. The method according to claim 1, which comprises:
a) determining a correction value by multiplying a reactive displacement power of the fundamental determined from the determined fundamental positive phase-sequence system actual-space-vector and a determined compensator current space-vector, by a constant; and
b) adding the correction value to the predefined positive phase-sequence system setpoint-voltage.

7. An apparatus for improving the voltage quality of a secondary power supply unit, comprising:
a compensation device having a pulse-controlled power converter with at least one capacitive storage device, a matching filter, a closed-loop and open-loop control device and an incoming feeder device;
said closed-loop and open-loop control device having a closed-loop control device for determining a transmission ratio space-vector, and said closed-loop and open-loop control device having a pulse-width modulator with outputs supplying control signals for said pulse-controlled power converter;
a coupling transformer serially coupling said compensator device to a power supply system;
said closed-loop control device having a controller for determining a basic transmission ratio space-vector, said controller having an input side, a positive phase-sequence system channel and a negative phase-sequence system channel on said input side, said positive phase-sequence system channel and said negative phase-sequence system channel having output sides, and an output-side computing device having inputs connected to said output sides of said positive phase-sequence system channel and said negative phase-sequence system channel;
said computing device having an output supplying the basic transmission ratio space-vector, and said computing device receiving a value of a link voltage of said capacitive storage device of said pulse-controlled power converter and a value of a transformer transmission ratio of said coupling transformer; and
said positive phase-sequence system channel and said negative phase-sequence system channel each receiving a determined power system voltage space-vector and each having an output supplying a respective one of a fundamental positive phase-sequence system deviation and a fundamental negative phase-sequence system deviation.

8. The apparatus according to claim 7, wherein:
said controller is an initial controller having an output;
said open-loop control device has n further controllers for determining n partial transmission ratio space-vectors, said n further controllers each have a device for forming a complex Fourier coefficient, an I controller, a device for forming a partial transmission ratio space-vector and an output; and
a summation point has inputs connected to said outputs of said n further controllers and to said output of said initial controller for determining a basic transmission ratio space-vector.

9. The apparatus according to claim 7, wherein said positive phase-sequence system channel has an input side with a first device for discrete Fourier transformation and a second device connected downstream of said first device for inverse discrete Fourier transformation, said second device has an output, and said positive phase-sequence system channel has a comparator with an inverting input and a noninverting input, said inverting input is connected to said output of said second device, and a third device is connected between said output of said second device and said noninverting input for forming a fundamental positive phase-sequence system setpoint-space-vector.

10. The apparatus according to claim 7, wherein said negative phase-sequence system channel has an input side with a first device for discrete Fourier transformation and a second device downstream of said first device for inverse discrete Fourier transformation, said second device has an output, and said negative phase-sequence system channel has a comparator with a noninverting input connected to said output of said second device and an inverting input receiving a fundamental negative phase-sequence system setpoint-space-vector.

11. The apparatus according to claim 9, wherein said negative phase-sequence system channel includes:
an input;

an input side with a first comparator having an inverting input connected to said output of said second device for inverse discrete Fourier transformation, a noninverting input connected to said input of said negative phase-sequence system channel, and an output; and a second comparator with a noninverting input connected to said output of said first comparator and an inverting input receiving a fundamental negative phase-sequence system setpoint-space-vector.

12. The apparatus according to claim 7, wherein said closed-loop control device determines a transmission ratio space-vector and has a determining device for determining a partial transmission ratio space-vector for an active power transfer, said determining device has an input side with a first device for discrete Fourier transformation and a second device downstream of said first device for inverse discrete Fourier transformation, said second device has an output, said determining device has a link voltage control circuit with an output, and said determining device has an output side with a multiplier having a first input connected to said output of said second device and a second input connected to said output of said control circuit.

13. The apparatus according to claim 7, wherein said closed-loop control device is a signal processor.

* * * * *